United States Patent [19]

Leiber

[11] Patent Number: 4,655,511
[45] Date of Patent: Apr. 7, 1987

[54] HYDRAULIC BRAKE BOOSTER WITH TRAVEL SIMULATOR AND ASSOCIATED ANTI-SKID BRAKE SYSTEM

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 695,141

[22] Filed: Jan. 25, 1985

[30] Foreign Application Priority Data

Mar. 16, 1984 [DE] Fed. Rep. of Germany ....... 3409705

[51] Int. Cl.$^4$ ..................... B60T 8/02; B60T 13/14; B60T 17/18
[52] U.S. Cl. ..................... 303/92; 60/545; 303/100; 303/114; 303/50
[58] Field of Search ............... 303/114, 92, 100, 103, 303/119, 50–56, 113, 93, 95–97, 105, 20; 188/181, 151 A; 60/591, 534, 545, 554, 565, 582, 547.1, 550, 551, 552, 562, 548, 581, 544

[56] References Cited

U.S. PATENT DOCUMENTS 4,143,514 3/1979 Leiber ........................ 303/114 X
4,286,826 9/1981 Leiber ........................ 303/114
4,346,942 8/1982 Leiber ........................ 303/92
4,482,192 11/1984 Leiber ........................ 303/100

Primary Examiner—Douglas C. Butler
Attorney, Agent, or Firm—Edwin E. Greigg

[57] ABSTRACT

A method and a multi-circuit brake booster for feeding back disruptions of any arbitrary kind, even of an associated anti-skid brake system, to a then-changed brake pedal characteristic, the influence on the brake valve triggering being effected via a travel simulator device. The transmitting member in the travel simulator device is a travel simulator spring enabling a predetermined idle pedal travel, and this spring responds whenever, in response to an arbitrarily generated disruption signal, a lockable storage element assumes its other position and mechanically engages a transmitting member in the chain from brake pedal actuation to brake valve slide actuation in an arresting manner. Upon reaching a predetermined amount of biasing, as a result of the further compression of the travel simulator spring, the opening of the brake valve then takes place abruptly, with a corresponding increase in brake pressure and a corresponding increase in vehicle deceleration.

12 Claims, 5 Drawing Figures

HYDRAULIC BRAKE BOOSTER WITH TRAVEL SIMULATOR AND ASSOCIATED ANTI-SKID BRAKE SYSTEM

BACKGROUND OF THE INVENTION

The invention is based on a method and on a hydraulic brake booster for feedback of disruptions to the brake pedal characteristic, and hydraulic brake booster.

Brake boosters in general are known from U.S. Pat. Nos. 4,143,514 and 4,482,192. In these known brake boosters, typically one brake circuit is closed and the other is open. The open brake circuit is supplied directly by a reservoir pressure supplied via a control valve or a brake valve. If the pressure supply should fail, the open brake circuit becomes a closed brake circuit. Generally, the open brake circuit includes an annular piston, which is mounted upon a pedal tappet actuated by the brake pedal.

Two basic types of brake boosters can be distinguished: those equipped with a travel simulating spring and those without such a spring, which exerts a perceptible force feedback upon the brake pedal. A problem in brake boosters equipped with travel simulators, which in principle is superior to brake boosters lacking travel simulators, is the lack of feedback of an initially arbitrary disruption in the brake circuit to the brake pedal. That is, disruptions such as the failure of a circuit, poor bleeding because of vapor bubbles, perhaps seizing of the control piston acted upon by brake pressure, and the like, are not perceived by the driver, or at least not at the point at which he himself directly influences braking of his vehicle; in other words, there is no feedback of the pedal characteristic to the driver's braking foot.

Although with such brake boosters having travel simulators it is possible to ascertain failures by evaluating the piston movements in comparison with the movement of the pedal tappet and then to indicate the movement by optical or acoustical signals, still the driver does not necessarily pay attention to such acoustical signals when they occur; also, he tends simply to keep driving, without eliminating the disruption, unless he quite characteristically feels the disruption when actuating the brakes.

OBJECT AND SUMMARY OF THE INVENTION

It is accordingly an object of the invention, in a brake booster having a travel simulator, to have optimal feedback, in human engineering terms, to the pedal characteristic of any failures or disruptions, such that the driver will be clearly aware that failures or disruptions have occurred, without being frightened or shocked.

A method according to the invention and a multiple-circuit brake booster according to the invention attain this object and have an advantage over the prior art that even in a brake booster with a travel simulator, feedback to the pedal characteristic of failures or disruptions can be accomplished in a manner that is optimized in human engineering terms. The invention attains a virtually ideal pedal feedback in such brake boosters, and in the event of a failure the change in the brake pedal characteristic is apparent, in fact may even be perceived as urgent, each time braking occurs, and in certain exemplary embodiments for an arbitrary number of subsequent braking operations, although vehicle braking is still possible.

A first possible embodiment of such a change in brake pedal characteristic may be such that upon a first braking operation, in which the disruption is detected and furthermore is preferably indicated immediately by means of a warning light, no feedback is apparent as yet, so that the driver can perform the braking normally, without being excited; however, the next time braking occurs the pedal characteristic is affected in the following advantageous manner: Initially, braking produces pedal travel without any notable increase in force, in the same manner as is generally the case in conventional brake boosters if a brake circuit fails. The driver will perceive this pedal travel as extremely unpleasant, and may already at this time take measures to have the vehicle serviced or repaired as soon as possible. This idle pedal travel is then followed by a jump in force, in which pressure is directed into the brake circuit; that is, the vehicle can be effectively braked by a corresponding increase in deceleration. However, this induction of brake pressure happens almost abruptly, which may also be combined with a small recoil upon the brake pedal. The idle pedal travel and the amplitude of this recoil can be realized and adjusted within wide limits. Even if a certain number of drivers do not notice the warning light or warning sound during the first braking, it can be expected with a brake pedal characteristic as described above that even inexperienced or sensitive drivers will notice this change in the pedal characteristic immediately, or after only a very few subsequent braking operations, because in accordance with an advantageous embodiment the brake booster according to the invention retains this characteristic. If there are also passengers in such a vehicle, the braking of which thus calls attention to itself because of disruptions or the like, then these passengers will become correspondingly uncomfortable because of the increase in decleration accompanying the abrupt increase in brake pressure. It may accordingly be reliably presumed that a forced brake pedal characteristic of this kind, combined with the resultant overall behavior of the vehicle during braking, will be noticed by the driver of the vehicle. Also, it is practically impossible to brake in a measured manner within the small pressure range in which the intense and abrupt induction of brake pressure takes place.

A different change from the above change in the brake pedal characteristic can be attained in an advantageous embodiment of the present invention if a failure reaction control device, which is triggered by a failure signal, ascertained initially in any arbitrary manner, and thereby activated, includes an electromagnetic final control element, such as an adjusting magnet, which then at least indirectly acts mechanically upon specific actuation elements in the vicinity of the travel simulator device. It may also be particularly advantageous here for the triggering of the electromagnetic final control element to be realized via an electrical vibrating circuit, for instance an astable multivibrator, so that the effect on the travel simulator device is produced periodically, with a predeterminable frequency such that by appropriately passing this pulsating final control element force on to the brake valve and/or, with direct feedback, to the brake pedal, a pronounced pulsation becomes perceptible at the brake pedal. This kind of feedback of a disruption is doubtless the most clearly perceptible for a vehicle driver.

A further embodiment of the present invention is that upon the appearance of the failure signal, which may also be detected by suitable lever mechanisms in the form of a displacement or pivoting of a lever, a slidingly supported arresting pin is displaced so far into the vicinity of actuating elements of the travel simulator device that a corresponding change in the pedal characteristic necessarily results, because the arresting pin acts from the outset as a stop and a disruption in the brake circuit can therefore be transmitted virtually proportionally in the form of a change in the brake pedal characteristic.

A particularly advantageous feature of the present invention is the attainment of the abrupt introduction of brake pressure by means of the reciprocal imposition of spring forces, which is produced by the detent position of energy storage means.

The invention will be better understood and further objects and advantages thereof will become more apparent from the ensuing detailed description of preferred embodiments taken in conjunction with the drawings.

DESCRIPTION OF THE PREFERRED EMBODIMENTS

First, the embodiment of a multi-circuit brake booster such as that shown in FIG. 1 will be discussed, for the sake of general understanding of the field of the invention and to show how the embodiments according to the invention are associated with brake boosters and what effects are produced thereby. However, it will be understood that the brake booster shown by way of example in FIG. 1 does not restrict the usage of the invention, which is applicable to every possible embodiment of brake boosters having a travel simulator device and in which at least one brake cylinder piston is movable upon actuation of the pedal, with pressure from an external pressure supply being introduced.

Figure 1:
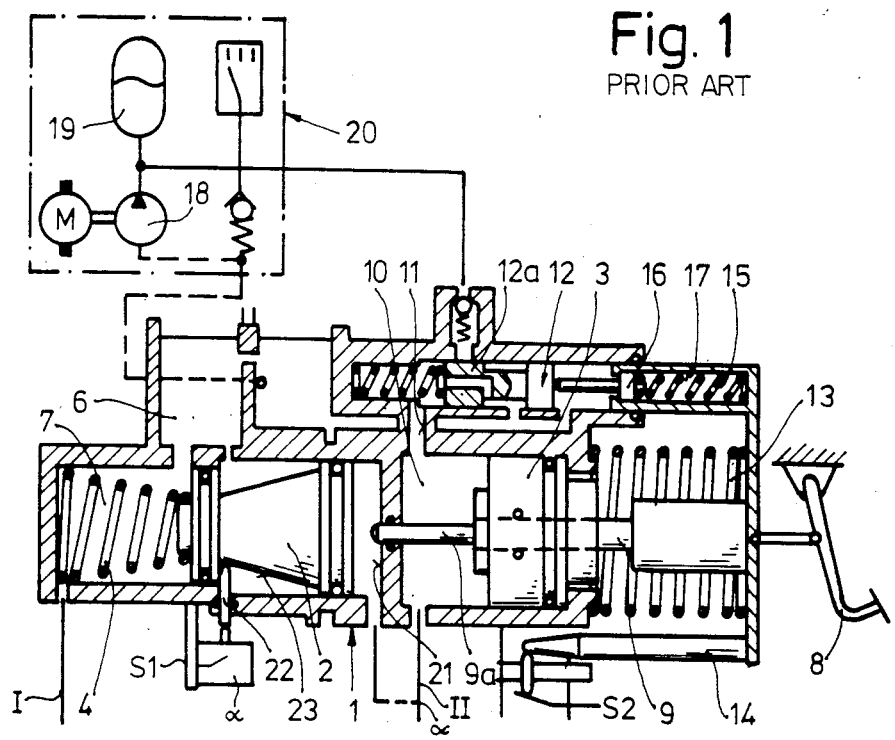
FIG. 1 shows an example of a brake booster apparatus having a travel simulator in an embodiment which is known in the prior art.

The brake booster shown in FIG. 1 includes a dual-circuit main brake cylinder 1, in which two pistons 2 and 3 are disposed one after the other in axial alignment. The front piston 2 is fixed in the conventional manner in the position shown in the drawing by a restoring spring 4, and at the same time in this position keeps a connection with a supply or refill container 6 and a main cylinder work chamber 7 open. Connected to this chamber, as shown, is a so-called first closed brake circuit I, conventionally via multiple-position magnetic valves not shown in detail, which lead to the various wheel brake cylinders and which, in the manner which is usual with anti-skid brake systems (ABS), adapt the brake pressure in the two brake circuits I and II appropriately to the properties of the road surface or to the wheel behavior, using a known electronic logical control circuit.

The second piston 3 is an annular piston and the pedal tappet 9, actuated by the brake pedal 8, passes through the piston 3. The annular piston is displaceably disposed in its associated portion of the main brake cylinder and with its inside face defines a chamber 10, which is connected via a conduit 11 to a brake or control valve 12 of the brake booster. In the exemplary embodiment shown, the control valve 12 is located outside the axis of the tandem main brake cylinder 1, but axially parallel with it. The actuation of both the control valve and the pedal tappet is effected by the brake pedal via a plate 13, on which a pin 14 is also secured, which cooperates with a switch S2 for position determination (position monitoring) of the pedal travel. The plate also supports a slide 16 for the control valve 12. The slide 16 is piston-like in embodiment and is resiliently supported via a travel-limiting spring 15, such that it is slidingly displaceable in a cylindrical guide 17, thereby producing the known function of a travel simulator with respect to the pedal actuation at the same time. The pressure chamber 10 is connected to the second brake circuit II, which in this sense embodies an open brake circuit.

The control valve 12 is located between a reservoir pressure supply device, substantially comprising a pump 18 and a reservoir 19, and the pressureless supply container 6; depending on the position of the control slide 12a in the control valve 12, which is determined by the brake pedal position, the control valve 12 connects the work chamber 10 with either the reservoir pressure supply apparatus 20 or a relief point refill container 6. In this embodiment of a brake booster shown in FIG. 1, it should also be noted that if the pressure supply should fail, a rod-like extension 9a of the pedal tappet 9 penetrates an internal partition 21 between the two main brake cylinders belonging to the separate brake circuits, and thus upon further pedal actuation is capable of acting mechanically upon the front main brake cylinder piston 2. A feeler pin 22, which travels on an oblique piston surface 23, may be provided to detect the movement of this main brake cylinder piston 2 and actuate an associated switch S1 which signals to the operator that the piston 2 has moved for braking.

Figure 2:
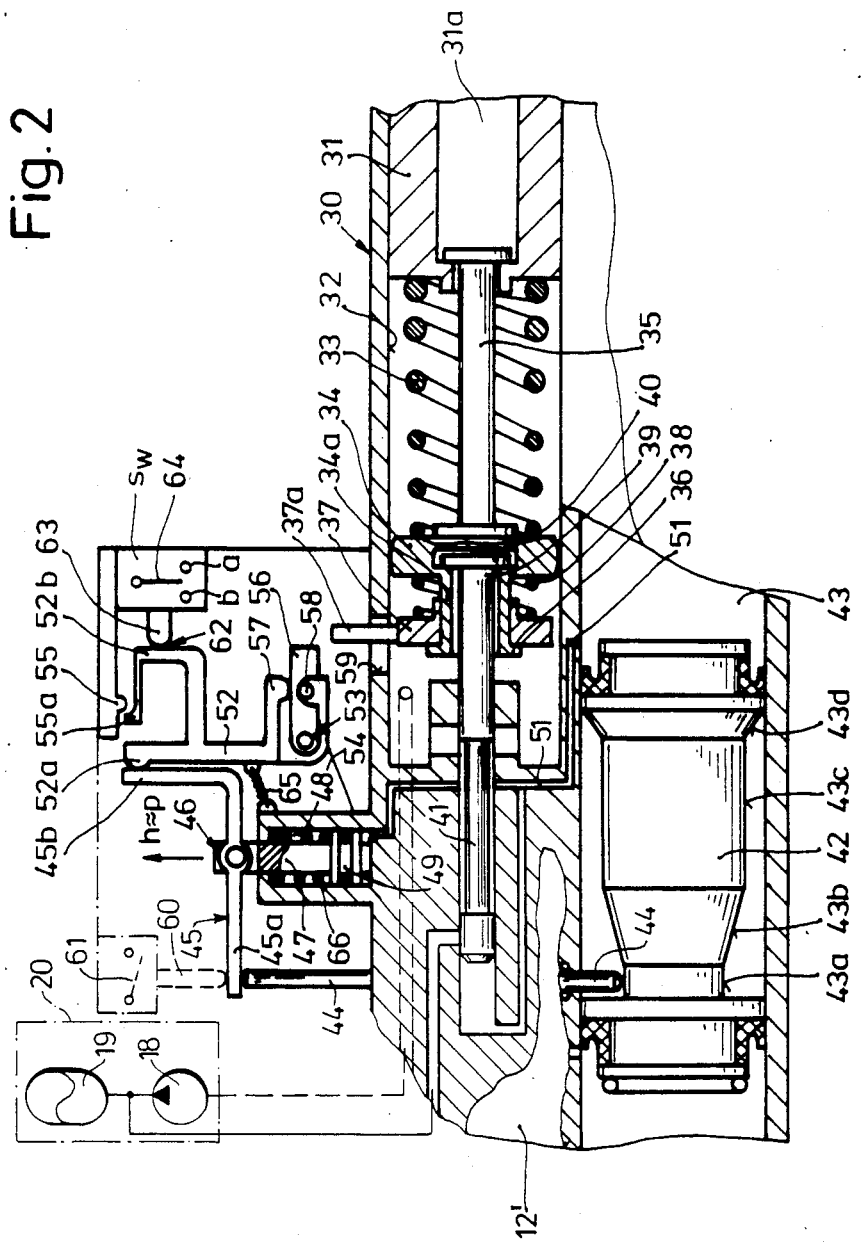
FIG. 2 is merely a fragmentary section showing the area of the travel simulator/control valve, in a first embodiment of the brake booster according to the invention.

A dual-circuit brake booster of this kind may be predominantly conventional in embodiment; however, it does make apparent the orientation and essential structure of the invention shown in FIG. 2 in terms of a first, predominantly mechanical exemplary embodiment.

In general, the invention shown in its basic features in FIG. 2—which it will be understood is not limited to the details of various levers and feeler pins or their mutual pivoting and influence—is that storage means are provided, which if the comparison of pedal movement, brake pressure and brake piston movement indicates a disruption can be moved into a second, preferably lockable state (this includes electrical or electromechanical storage means as well). In the vicinity of the travel simulator device a switchover, or shunting reaction, is made to a pedal tappet movement such that the further transmission of the brake signal obtained by actuation and by further depression of the brake pedal is retarded either in terms of time or location; in other words, no effect outside the system takes place, but the introduction of brake pressure takes place abruptly thereafter.

In the exemplary embodiment shown in FIG. 2, a piston 31 is shown in fragmentary section in the area of the travel simulator device 30—in a partial modification of the embodiment of the travel simulator of FIG. 1. In a basically similar fashion to the piston-like slide 16 of FIG. 1, this piston 31 is supported in a cylindrical guide 32 and is connected to and actuated by the brake pedal, the pedal tappet and/or the pedal plate 13. The piston 31 in the vicinity of the travel simulator device 30 includes a travel simulator spring 33 which is supported on one end of the piston 31; the travel simulator spring 33 is supported on the other end on a guide part 34 which is slidably supported in the same cylindrical guide 32. Thus, a coupling of the piston 31 and the guide 34 is effected via the travel simulator spring 33; furthermore, for instance to center the travel simulator spring 33 and to guide the piston in a straight path, a connecting rod 35, flattened in plate-like fashion on both ends, may be provided, which upon displacement of the piston 31 when the brake pedal is actuated and the piston sides to the left, in the plane of the drawings, the connecting rod slides into the piston 31 within a cylindrical chamber 31a.

The guide part 34 itself is also piston-like in embodiment, with an extension 34a representing a modification as compared with the piston 31 and having a smaller diameter, on which a collar-like sliding element 37 is supported in a slidably displaceable manner, the sliding element is biased by a spring 38 against a stop 36 on the end of the smaller diameter portion which is embodied as an annular shoulder.

This travel simulator device 30 is augmented in that the guide part 34 itself also supports an axially extending elongated, piston-like actuation rod 39 in a positive manner, for instance by means of a collar-like recess 40, which thereby passes through the extension 34a and itself is part of the brake valve slide, also shown at 41, of the brake valve 12', shown in detail, of the embodiment of FIG. 2. The actuation and mode of operation of this brake valve 12' are effected as usual, which also applies to the effects of such an actuation; that is, the reservoir pressure is introduced directly to the brake circuits or for acting upon the main brake cylinder pistons, which then in turn introduce pressure to the wheel brake cylinders, and the introduced pressure is fed back to the piston 31.

In the lower portion of FIG. 2, at least one main brake cylinder piston 42 is also shown, solely by way of example and not to be considered limiting in terms of its structure. This main brake cylinder piston 42 can be moved by a pressure introduced into a preceding pressure chamber 43 by the brake valve 12' and the interior of which has different diametrical surfaces 43a and 43c and oblique surfaces 43b–43d, over which a feeler pin 44 travels during the movement of this piston 42. The feeler pin 44, bypassing the disposition and structure of the brake valve 12', continues above the brake valve and there meets an L-shaped lever 45, which is pivotably supported at 46 in the vicinity of its longer arm 45a. The fact that the pivot point 46 of the lever 45 can in turn itself undergo shifting is a preferred embodiment of the present invention, and although it does not limit the invention it will be discussed immediately at this point. In fact, the pivot point 46 for the L-shaped lever 45 is formed by an eye-like extension or a piston-rod-like extension 47 of a piston 49 supported in a control cylinder 48 perpendicular to the axis of piston 31, and the pressure chamber 50 of the control cylinder below the piston 49 is acted upon, via a suitably embodied connecting conduit 51 in the interior of the housing, by the same hydraulic pressure as is produced or builds up in the pressure chamber 43 during a braking operation, as a result of the triggering of the brake valve 12'.

The embodiment of the present invention shown in FIG. 2 also includes a second lever 52, which acts as a locking or detent element and, as shown in the drawing, is operated by contact with the shorter arm 45b of the L-shaped lever 45, for instance via a cam-like sliding element 52a. The locking member/lever 52 is pivotably supported at 53, for instance via a support fin 54 articulated on the housing of the control cylinder 48. As one possible form of locking or detent means for the locking member/lever 52, a protrusion or cam 55 integral with the housing is shown for the exemplary embodiment shown in FIG. 2. This cam 55 can be gripped from behind by an extension 55a on a bent arm portion 52b of the detent element/lever 52, which arm portion 52b is preferably embodied as resilient, at least in part. It will be appreciated that when the detent member/lever 52 pivots clockwise about the pivot point 53, the extension 55a will drop behind the cam 55, and this lever then also remains in this position. This pivoting of the lever 52 just mentioned is effected, as will be explained later herein, by pivoting the first lever 45 about its pivot point 46.

The structure of the travel simulator device, embodied with a view to human engineering, is completed, especially in the detent member area, by a lever 56 embodying a stop, which is articulated in the same pivot point 53 as the detent member/lever 52 and is rectilinear in embodiment. This lever 56 can be pressed downward, in the plane of the drawing, against a stop 58 by an extension 57 on the detent member/lever 52. Further components which are also provided for realizing the present invention, or are advantageously included, will be described later herein, in combination with an explanation of the mode of operation of the invention.

Figure 5:
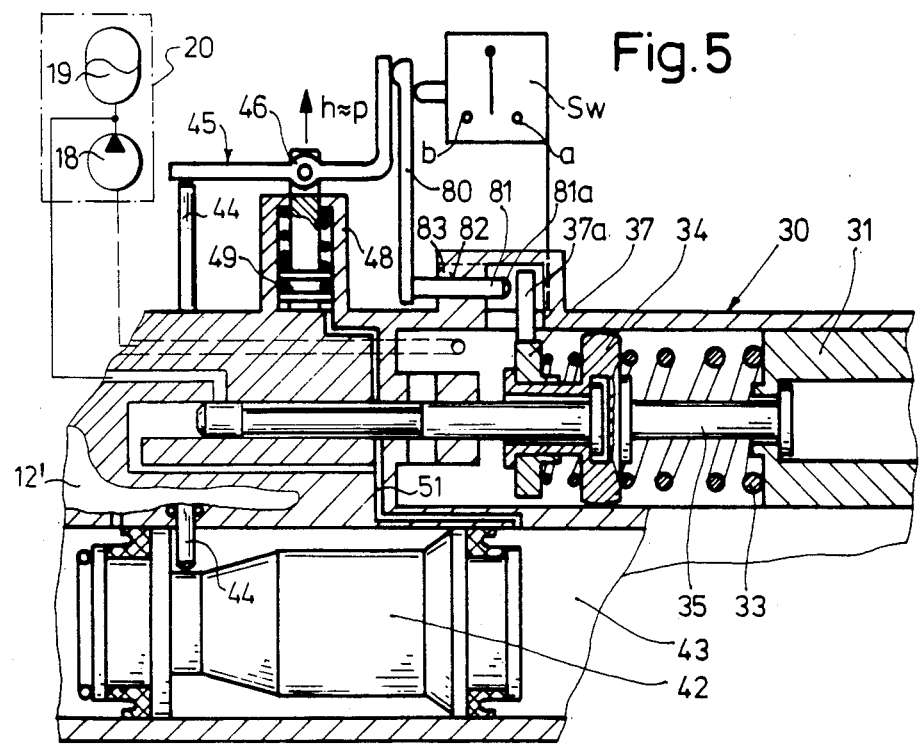

The valve 12' and its valve slide 41, the pressure supply device 20 with the pump 18 and the reservoir 19, and connections from this pressure supply device 20 to the valve 12' have been shown in FIGS. 2 and 5. In the basic position of the valve slide 41 shown, the connecting conduit 51 and hence the pistons 42 and 49 are relieved of pressure in favor of the pump 18. A displacement of the rod 39 toward the left first terminates the pressure relief and then, via the valve slide 41, causes pressure medium to flow out of the pressure supply device 20 into the connecting conduit 51 and to the cylinders 43 and 48 containing pistons 42 and 49 respectively.

The rod 44 rides on the piston 42 and extends to below the lever 45. On the right of the rod 44, the piston 42 is conical, so that when it is displaced toward the left to generate braking pressure, piston 42 lifts the rod 44 and the end of the lever 45 located above it.

In the examples according to FIGS. 1, 2 and 5, the springs 15 and 33 serve to displace the valve slides 12a and 41. To this end, by means of brake pedal 8, the guide 17 and the piston 31 are displaced, each toward a respective spring 15 or 33. The slide 16 and also the guide part 34 transmit spring forces to the valve slides 12a and 41.

The connecting conduit 51 always remains open, so that any pressures acting upon the pistons 42 and 49 are identical. The rod 39 serves to terminate the pressure relief mentioned above and subsequently to displace the valve slide such that pressure medium flows out to the pressure supply device 20 into the connection conduit 51 and to the pistons 42 and 49.

Mode of Operation—Normal Conditions

The mechanical system described thus far is capable of detecting movements caused by a brake pedal actuation, which take place at both the control piston and naturally at the main brake cylinder piston because of the introduced brake pressure, and comparing these movements with one another; if predetermined tolerance limits are exceeded, then in combination with influence exerted on the travel simulator device, it is capable of effecting a virtually ideal pedal feedback, in human engineering terms, in the event of disruptions and failures.

For normal braking, the piston 31 joined to the pedal tappet not shown is displaced first, and the guide part 34 is displaced as well, in synchronism with piston 31, under the influence of the appropriately embodied travel limiting spring 33. Thus the brake valve slide can be adjusted in a desired manner, via the actuation rod 39, in order to introduce the required brake pressure, drawn from the pressure supply means, into the pressure chamber 43 by way of example. This unhindered displacement of the guide part 34 as well, along with its collar-like slide element 37 supported on it, is possible even though an upward-pointing arresting nose 37a is disposed in the form of an extension on the slide element 37. However, the arresting nose 37a is capable of moving in a corresponding recess 59 of the guide 32 in order to restrict movement of the brake valve 12' and does not come into contact with the last-named lever 56, at least not during normal operation, free of disruptions. In fact, the course of a normal braking of this kind is such that although the feeler pin 44 slides over the oblique face 43b, for example of the main brake cylinder 42, which is the only one mentioned here, and which under the pressure of the hydraulic medium located in the chamber 43 moves toward the left in the plane of the drawing; at the same time, however, under this pressure the piston 49 that supports pivot/support point 46 for the lever 45 is raised, so that the lever 45 does not pivot out of its position of rest via the feeler pin 44. All that happens, in an advantageous manner, is that a feeler cam 60 is actuated for closing a brake light switch 61 and for indicating contact. Disposing the brake light switch 61 at this location within the apparatus according to the invention is advantageous because a tedious adjustment of a pedal mechanism, which conventionally has only roughly defined tolerances, can thereby be dispensed with.

Mode of Operation—Disrupted Conditions

The invention succeeds in detecting any conceivable disruptions whatever in the event of a defective brake circuit or disrupted functioning of the brake booster or its component parts, such as poor bleeding of the closed brake circuit or a failure of a brake circuit, or in the instance of the present exemplary embodiment a seizing of the control piston 49 simultaneously experiencing the brake pressure. However, it is also possible to detect defective movements in the vicinity of the main brake cylinder piston, or excessive wear of the switch tappet. Specifically, the bent extension 52b on the detent member/lever 52 is in fact embodied such that it keeps a further disruption switch Sw in a central position of the shift lever 64, by resting at 62 on the switch tappet 63, and the shift lever 64 thus is in contact with neither of the two counterpart contacts a and b. Contact can be made and a defect thus reported in both cases, however, that is, either if the switch tappet 63 is depressed more severely with contact made with contact element a or if the detent member/lever 52 is tilted fully away, causing contact to be made with the contact element b. In both cases, this means that the defect is reported.

The illustration of the lever geometry in FIG. 2 also shows directly which failures can be detected by which contact indications. For instance if the brake pressure to be introduced via the brake valve 12' is entirely absent because of a failure of the pressure supply, then the control piston 49 cannot move upward out of its outset position; the pivot point 46 of the first lever 45 remains stationary, and the mechanical displacement, of piston 42 effected via the pedal tappet, of the main brake cylinder piston 42 effects the upward movement of the feeler pin 44 against lever 45 which then causes a corresponding tilting of the lever 45 about its pivot point. The lever 45 presses the detent lever/member 52 toward the right in the plane of the drawing, until the detent means 55/55a lock the new position; as a result, the switch contact indication a is effected simultaneously, and the second lever 56 also drops downward, causing it to enter the path of the detent extension 37a on the slide element 37, if the slide element 37 again moves toward the left in the plane of the drawing in order to restrict movement of the brake valve 12'. This pivoting of the first lever 45 and the further depression of the detent member/lever 52 is also produced, as already mentioned, in the event of poor bleeding of the brake circuit or if there is a brake circuit failure.

The following further function then results, with the second lever 56, already mentioned, having first moved upward out of the way of the arresting nose 37a of the slide element 37, because of movement of arresting nose 37, upon this first braking during which the disruption is detected and initially indicated by an electrical signal (switch Sw), is still located in the deflected position for triggering brake pressure via the brake valve slide.

In the next braking and every subsequent braking, however, this lever 56 comes into contact on its end face with the arresting nose 37a and initially prevents the common movement of the guide part 34 and the slide element 37 under the pressure of the travel simulator spring 33, whenever the piston 31 is moved again during these braking operations. As a result, there is a corresponding compression of the travel simulator spring, because the guide part/slide element are resting on a stop, caused by the locking of the detent member/lever—in this phase, no movement of the brake valve slide to introduce the brake pressure is possible yet. Only after the biasing force of the spring 38 keeping the slide element 37 stopped against the guide part 34 is overcome, as the compression of the travel simulator spring becomes more and more pronounced, which corresponds to a corresponding idle pedal travel without a notable increase in force, does any movement of the brake valve slide occur (although when it does, it is substantially jerky), with an immediate introduction of pressure. The effect attained thereby will be discussed later herein, in conjunction with the diagram of FIG. 4.

The report of a disruption pertaining to seizing of the main brake cylinder piston 42 or excessive wear of the switch tappet is then effected in that although the control piston 49 moves upward in response to a proper introduction of pressure, the feeler pin 44 is not moved along with it because the main brake cylinder piston is stuck, and the slide element 42a of the detent member/lever 52 therefore finally moves free of the shorter arm 45b of the lever 45, and the detent member/lever 52 tips backward, under the influence of a small additional biased spring 65, so that the contact b of the switch Sw is released. It will be understood that the correspondingly opposed slide faces of the smaller arm 45b and the lever part, sliding along it, of the detent member/lever 52 can be embodied such that a tipping process of this kind is reversible. In other words, the restoring spring 66 for the control piston 49, given a corresponding shaping, can press the detent member/lever 52 back into its normal position as shown in FIG. 2, or the reversed position can also be retained, if desired, so that the alarm indication functions continuously. It will be understood that an arresting option for the arresting nose 37a of the slide element 37 can also be derived from this backwardly tipped position of the detent member/lever 52, which option comes into effect for this case, thereby producing the same pedal characteristic as described above.

Design of a Second Exemplary Embodiment

Figure 3:
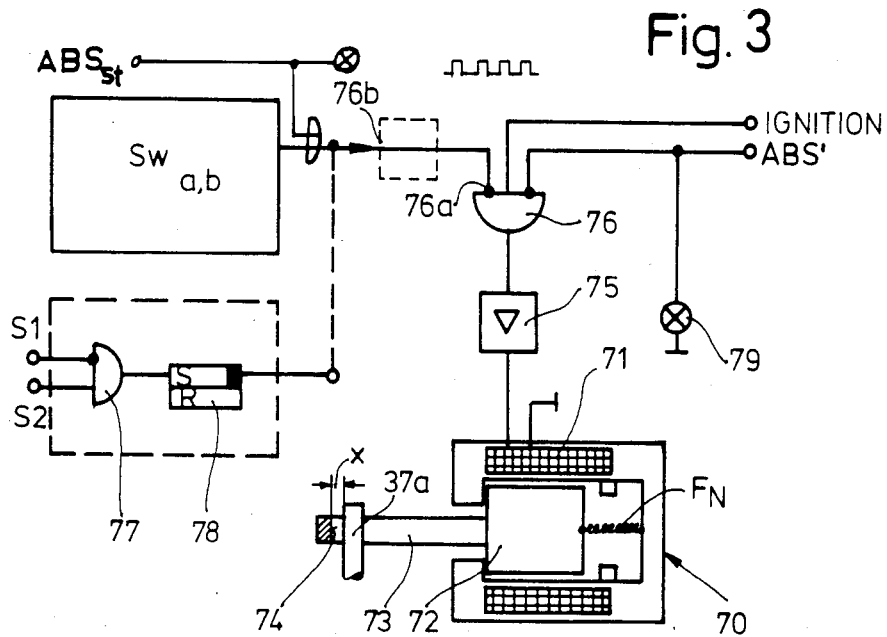
FIG. 3, in schematic form, shows a detail of a variant of the present invention for influencing the travel simulator device.

As an alternative to mechanically influencing the travel simulator device, an electromagnetic adjusting member may also be provided, as is shown in a highly schematic fashion in FIG. 3. The electromagnetic adjusting member includes a reciprocating magnet 70 with an armature winding 71 and armature 72. An armature tappet 73 is secured on the armature and has a fork element or slot-like receptacle opening 74, in which the arresting nose 37a of the slide element 37 can in any event move by the amount x, which is required so that in normal operation the brake valve slide can be fully arrested. The triggering of the electromagnetic adjusting member 70 is effected by means of an amplifier 75 via an AND member 76, which is triggered at its inputs at least by the switching on of the ignition and at the input 76a by a disruption or failure signal, which may be obtained in various ways, for instance by making contact with the disruption switch Sw in both cases (a, b). If such a disruption occurs, then the triggering of the power end stage 75 of the adjusting member is switched off via the AND gate; from then on, the armature is under the influence only of the armature restoring spring $F_N$, which retracts the free travel length x of the arresting nose 37a by the length, so that no further displacement of the guide part 34/slide element 37 is possible. The armature restoring spring then acts counter to the travel simulator spring and effects the idle travel described at the outset above, with a slight increase in force. It will otherwise be understood that in this specialized instance where an armature restoring spring is present, the collar-like slide element 37 may under some circumstances be dispensed with entirely, and an arresting nose element integrally joined to the slide element 34 can engage the opening 74 of the armature. A displacement of the guide part 34 into the brake pressure introduction position can occur under these circumstances whenever the travel simulator spring finally overcomes the force of the armature restoring spring.

It has already been noted at the outset that the lever mechanism shown by way of example for the sake of better comprehension of the invention is merely a non-limiting exemplary embodiment; in other words, taking the first exemplary embodiment of FIG. 1 as an example, it is also possible to evaluate a discrepancy between the pedal tappet movement on the one hand and the at least one main brake cylinder movement on the other, by detecting the switch signals S1 and S2 (see FIG. 1). The switch signals S1 and S2 may, for instance, as schematically shown in FIG. 3, be carried via an input gate 77, having an inverting input, to a following memory circuit 78, which may be an R/S flip-flop. The memory is set, or in other words shifts over into its disruption position, whenever the switch S1 (for instance) does not yet respond although a switching signal from switch S2 is already present. In this case again, the report of a disruption is produced by the triggering of the AND gate 76 at the input 76a, and this report serves to lock the arresting nose 37a, or the guide part 34 directly, resulting in the special brake pedal failure characteristic already mentioned.

Finally, it is possible to derive a failure signal from specific switching states of an anti-skid brake system (ABS) already associated with the brake booster in a manner known per se. It is not necessary here to discuss in detail how an ABS disruption signal, which is represented in FIG. 3 by the symbol ABS', is derived from a logical control circuit, as part of an anti-skid brake system, and from its signal distribution, because this is not the subject of the present invention. Conventionally, such disruption signal reporting systems are known, for instance in combination with so-called fail-safe safety circuits the output signal of which, among other purposes, is used for triggering a display device, display light 79 in FIG. 3 signalling to the driver either disruption-free or disrupted operation of the anti-skid brake system. Parallel to the triggering of this light by the failure signal ABS' of the anti-skid brake system, this signal may be delivered to a further input, in this case embodied again as an inverting input, of the AND gate 76, so that even in the event of disruptions of the anti-skid brake system, the electromagnetic adjusting member 70 is actuated, and the brake pedal failure characteristics already explained in detail above is again generated.

In conjunction with FIG. 4, which is in the form of a diagram, the various pedal characteristics resulting for normal operation (curve I) and for disrupted operation (curve II) will now be explained in more detail, in the form of function courses of the pedal force $F_{ped}$ over the pedal travel s, measured in mm. In the absence of a report of disruption or failure, the adjusting force $F_R$ of the piston 31 takes effect, beginning at the point of origin on the graph, until after a specific amount of travel, for instance 1.5 mm, the brake valve 12' introduces pressure and a corresponding force increase, the course of which is usually progressive, thereby results. This brake pressure increase, which is expressed in the pedal force, is produced essentially in the conventional manner for brake boosters having a travel simulator, in that the introduced pressure of the hydraulic medium not only acts upon the at least one brake circuit via the pressure chambers of the brake booster, but also has a feedback effect on the actuation piston, so that the driver has a sense of the resultant brake force.

Figure 4:
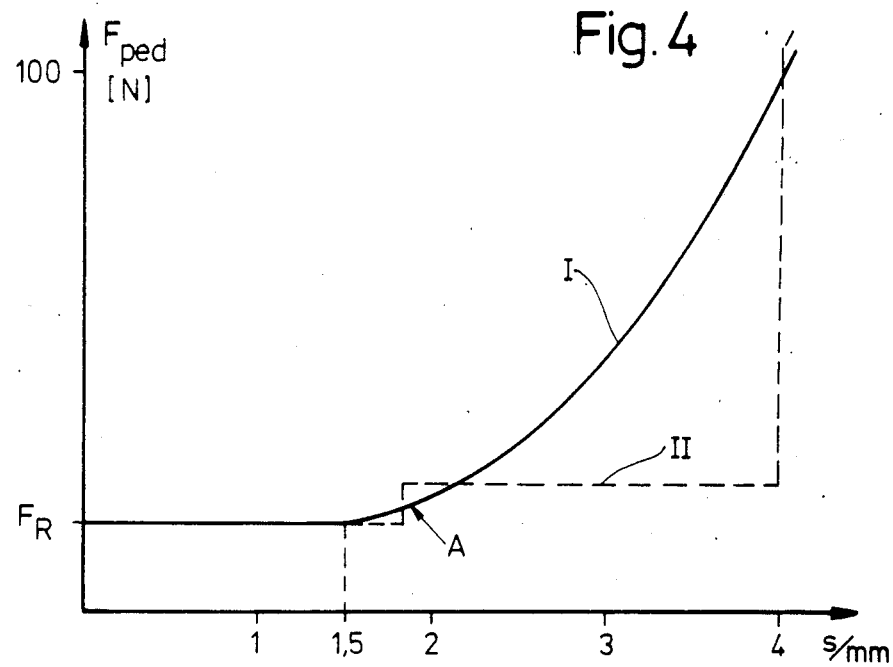
FIG. 4, with the aid of a diagram, shows various pedal characteristics for normal operation and in the event of a disruption, as functions of the brake pedal force over the actual travel of the brake pedal; and, FIG. 5 shows an apparatus similar to FIG. 2, for ascertaining failures, but without any detent option.

In contrast to this, when a failure exists there is initially a small force jump, as shown at A in curve II of FIG. 4, and the cause of this is that the travel simulator, or more specifically and in terms of the exemplary embodiments shown, the arresting nose strikes the detent device (lever 56) or encounters the action of the electromagnetic adjusting member. As the course continues, there is a considerable idle travel, which is caused by the compression of the travel simulator spring 33, which travel is ineffective with respect to the brake valve 12'. If the travel simulator spring then overcomes the biasing force of the particular displacement member involved, then after a correspondingly small increase in force the result is that pressure is fed into the booster, causing the virtually abrupt increase in the course of the feedback force upon the pedal tappet. It will be understood that by appropriately designing the components in the vicinity of the travel simulator device that participate in this process, both the idle travel and the force and pressure increases can be freely selected within wide limits. It is thus possible to generate a pedal feedback effect for the failure mode which is virtually optimal in human engineering terms.

A preferred realization of the embodiment of the present invention shown in FIG. 3 also provides that triggering of the reciprocating magnet 70 embodying the electromagnetic adjusting member may be effected via an electric vibrating circuit, which is preferably incorprated in the triggering line from the disruption switch Sw or from the switch signals S1, S2 via the following memory circuit 78. This electric vibration circuit is also shown in FIG. 3, in dot-dash lines, as element 76b and is incorporated into the line leading to the input connection 76a of the AND gate 76. An astable multivibrator is preferably used here, which via the AND gate 76 and the amplifier 75 triggers the adjusting magnet such that in synchronism with the rectangular output pulse train of the astable multivibrator, the result is a pulsation of the adjusting magnet, and in a corresponding manner via the travel simulator device a pulsation of the brake pedal as well. A disruption feedback of this kind is the one perceived most clearly by the driver under some circumstances, and it calls attention to the disruption that has been detected, so that correspondingly immediate steps can be taken to correct the failure.

Design and Function of a Further Exemplary Embodiment

In the exemplary embodiment of the invention shown in FIG. 5, in which elements that are the same in terms of structure and function are identified by the same reference numerals, the mechanical system acted upon by the pivoting lever 45 in the case of disruption is different, being no longer lockable in the exemplary embodiment of FIG. 5; nevertheless, it retains its options of affecting the travel simulator device 30 in order to vary the pedal characteristic, although in a modified form. In detail, an actuation lever 80 is provided, which in the event of a disruption undergoes a displacement to the right in the plane of the drawing via the pivot lever 45, in fundamentally the same manner as the detent member/lever 52, but with the difference that a sliding or arresting pin 81 is preferably integrally secured on the actuation lever 80, being supported in a slidably displaceable manner in a sliding guide 82, integral with the housing, of a housing extension 83. The ability of the actuation lever 80 to act upon the disruption switch Sw is retained in the event of disruption.

The following mode of operation is the result. In this exemplary embodiment, again, the brake pressure introduced by the brake valve is compared with the piston position, and if the brakes are intact the travel of the adjusting piston 49 in the adjusting cylinder 48 acted upon by the brake pressure is equal to the travel performed by the feeler pin 44, which detects the displacement of the main brake cylinder piston 42. In this case where the brakes are intact, the pivoting lever 45 is therefore displaced only upward, and the following feeler rod 44 cannot pivot it away. There is a distance between the end area 81a of the arresting pin 81 and the detent nose 37a for this instance which is sufficient that the movement of the brake valve by the travel simulator device 30 is possible.

However, if because of a disruption in the brake circuit the main brake cylinder piston 42 moves more than the pivot point 46 for the pivoting lever 45, which pivot point is raised by the adjusting piston 49, then the lever 80 and with it the arresting pin 81 are moved to the right in the plane of the drawing, axially parallel to the piston of the travel simulator device 30 and the main brake cylinder piston. As a result, a force is produced which acts counter to the force of the travel simulator spring, bringing about a marked change in the pedal characteristic. By this realization of the invention, a disruption in the brake circuit can be translated virtually proportionally into the change in the pedal characteristic, so that feedback to the driver is obtained, in the manner resulting in somewhat similar fashion in conventional brake boosters as well.

A further advantageous embodiment of the present invention provides that ABS and/or brake light failure signals, which can be associated generally with the brake system, can be made perceptible to the driver—preferably in addition to an optimal display which is always possible—in that the vibration circuit located in the triggering line to the electromagnetic adjusting member 70, namely the astable multivibrator 76a, is likewise triggered via these failure signals and activated such that as already described above, the pulsating effect on the brake pedal characteristic is produced.

All the characteristics described in the specification, shown in the drawing and recited in the following claims can be essential to the invention, either singly or in combination with one another.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A brake booster having a travel simulator device comprising a multi-circuit braker booster and an associated anti-skid brake system, a travel simulator, a failure reaction adjusting device, an error signal generation means disposed on said brake booster for generating a failure signal for actuating said failure reaction adjusting device for feedback of failures in the area of the brake booster as well as by an anti-skid brake system, said failure reaction adjusting device includes storage means capable of being switched over into a locking position and which via a following adjusting member intervene arrestingly in a further transmission of a brake signal to a brake valve in the vicinity of the travel simulator device for a predetermined period of time, said travel simulator device includes a piston actuatable by the brake pedal, a travel simulator spring supported on one end of said piston and that another support point for the travel simulator spring is embodied by a guide part supported such that said guide part is slidably displaceable, which on one end supports a fixed brake valve slide and supports a collar-like slide element slidably displaceably, under a separate spring biasing, wherein the event of a disruption in a brake circuit, said collar-like slide element includes an arresting nose which comes into an arresting operative connection with the adjusting member.

2. A brake booster as defined by claim 1, which includes at least one feeler pin which detects a piston displacement effected under fluid pressure introduced by the brake valve said feeler pin engages a pivoting lever, and that the pivoting lever rests on a detent member/lever used as a storage means, which controls both electrical failure indicating means and an adjusting member which are movable into an arresting operative connection with the slide element.

3. A brake booster as defined by claim 2, in which said pivoting lever is supported by a pivot support acted upon by a feeler pin and displaceable by a hydraulic pressure medium introduced by the brake valve, in such a manner that upon simultaneous occurrence of the pressure introduction and the piston displacement, the pivoting lever remains in its position of rest.

4. A brake booster as defined by claim 3, in which the pivot lever is L-shaped in embodiment and includes an arm which opposes an operative area of said feeler pin and embodies a sliding engagement face for the actuation of the stationary, pivotably supported detent member/lever, in such a manner that by means of the displacement of the pivoting lever in the event of disruption, the detent member/lever is tiltable into a first disruption locking position and carries along with it an adjusting member embodied as a lever separately pivotable about a pivoting point, such that said adjusting member embodies a stop for said arresting nose of the slide element for the next and subsequent braking operations.

5. A brake booster as defined by claim 4, in which said detent member/lever is pivotable into a second, opposed arresting position whenever, in the absence of a feeler pin movement, the pivot point of the first pivoting lever undergoes a shift in position by means of the introduced brake pressure.

6. A brake booster as defined by claim 5, in which in both detent positions of the detent member/lever, means is provided for indicating an electric failure signal.

7. A brake booster as defined by claim 6, in which said pivot point of said pivoting lever is embodied by a piston-like extension of a control piston supported in a slidably displaceable manner, under the introduced brake pressure, in a cylinder guide.

8. A brake booster as defined by claim 7, in which a tappet of a brake light switch is disposed in the vicinity of said feeler pin on said pivoting lever.

9. A brake booster as defined by claim 8, in which said adjusting member for the intermittent arresting of the further transmission of the brake signal until the attainment of a predetermined biasing value of the travel simulator spring is an electromagnet, including an armature tappet which, enables a free movement of the slide element for the brake valve triggering, but in the case of a disruption overcomes the force of the armature restoring spring ($F_N$) with the force of the travel simulator spring until the end of a predetermined idle travel length.

10. A brake booster as defined by claim 9, in which said electromagnetic adjusting member is triggered by an interposed amplifier and is effected by an AND member activatable by switching on an ignition, to which said AND member disruption signals can alternatively be delivered from the detent member/lever, from piston movements and pedal tappet movement via a pair of switches sensing oblique surfaces by means of feeler pins.

11. A brake booster as defined by claim 10, in which a vibrator circuit is incorporated into the line to the electromagnetic adjusting member which periodically triggers the adjusting member in such a manner that upon the occurrence of a failure signal, a pulsation of the brake pedal is produced.

12. A brake booster as defined by claim 11, in which an ABS failure signal and a brake light failure signal is also delivered directly to the vibrator circuit triggering the electromagnetic adjusting member in order to generate a pulsating feedback effect upon the brake pedal.

* * * * *